United States Patent
Arastafar

(10) Patent No.: US 8,392,832 B2
(45) Date of Patent: Mar. 5, 2013

(54) DISPLAY PLACEHOLDERS FOR RICH MEDIA CONTENT

(75) Inventor: Martin Arastafar, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 500 days.

(21) Appl. No.: 12/701,182

(22) Filed: Feb. 5, 2010

(65) Prior Publication Data

US 2011/0197126 A1    Aug. 11, 2011

(51) Int. Cl.
 *G06F 17/00* (2006.01)
(52) U.S. Cl. .................. 715/273; 715/201; 715/864
(58) Field of Classification Search .................. 715/273, 715/864, 201, 205
See application file for complete search history.

(56) References Cited

U.S. PATENT DOCUMENTS

| | | | | |
|---|---|---|---|---|
| 6,011,537 | A * | 1/2000 | Slotznick | 715/733 |
| 7,249,196 | B1 | 7/2007 | Peiffer | 709/246 |
| 8,078,693 | B2 * | 12/2011 | Luk et al. | 709/219 |
| 8,171,421 | B2 * | 5/2012 | Tapuska | 715/781 |
| 2004/0210830 | A1 * | 10/2004 | Cote et al. | 715/501.1 |
| 2006/0075336 | A1 * | 4/2006 | Gawor et al. | 715/530 |
| 2006/0136552 | A1 * | 6/2006 | Krane et al. | 709/203 |
| 2007/0242630 | A1 * | 10/2007 | Yoo | 370/310 |
| 2008/0097970 | A1 | 4/2008 | Olstad | 707/3 |
| 2009/0037724 | A1 * | 2/2009 | Carion et al. | 713/100 |
| 2009/0089669 | A1 * | 4/2009 | Knowles | 715/273 |
| 2009/0111448 | A1 * | 4/2009 | Paila | 455/418 |
| 2009/0177538 | A1 * | 7/2009 | Brewer et al. | 705/14 |
| 2009/0297130 | A1 * | 12/2009 | Otsuka et al. | 386/124 |
| 2010/0023863 | A1 * | 1/2010 | Cohen-Martin | 715/723 |
| 2010/0100800 | A1 * | 4/2010 | Cote et al. | 715/208 |
| 2010/0107091 | A1 * | 4/2010 | Amsterdam et al. | 715/760 |
| 2010/0190478 | A1 * | 7/2010 | Brewer et al. | 455/414.1 |
| 2011/0060772 | A1 * | 3/2011 | Warner et al. | 707/812 |
| 2011/0087960 | A1 * | 4/2011 | Tabone et al. | 715/256 |
| 2011/0088039 | A1 * | 4/2011 | Tabone et al. | 718/104 |
| 2011/0119386 | A1 * | 5/2011 | Murrett et al. | 709/227 |
| 2012/0124469 | A1 * | 5/2012 | Nakajima et al. | 715/702 |

* cited by examiner

*Primary Examiner* — Cong-Lac Huynh
(74) *Attorney, Agent, or Firm* — Allen, Dyer, Doppelt, Milbrath & Gilchrist, P.A.

(57) ABSTRACT

Methods, systems, devices, and programming structures for providing temporary substitute placeholder content for rich media content in data sets downloaded to wireless communications devices. The substitute placeholder content may be logically related to the rich content for which it substitutes, and may be displayed in the same relative size and location as the rich content ultimately to be displayed.

17 Claims, 6 Drawing Sheets

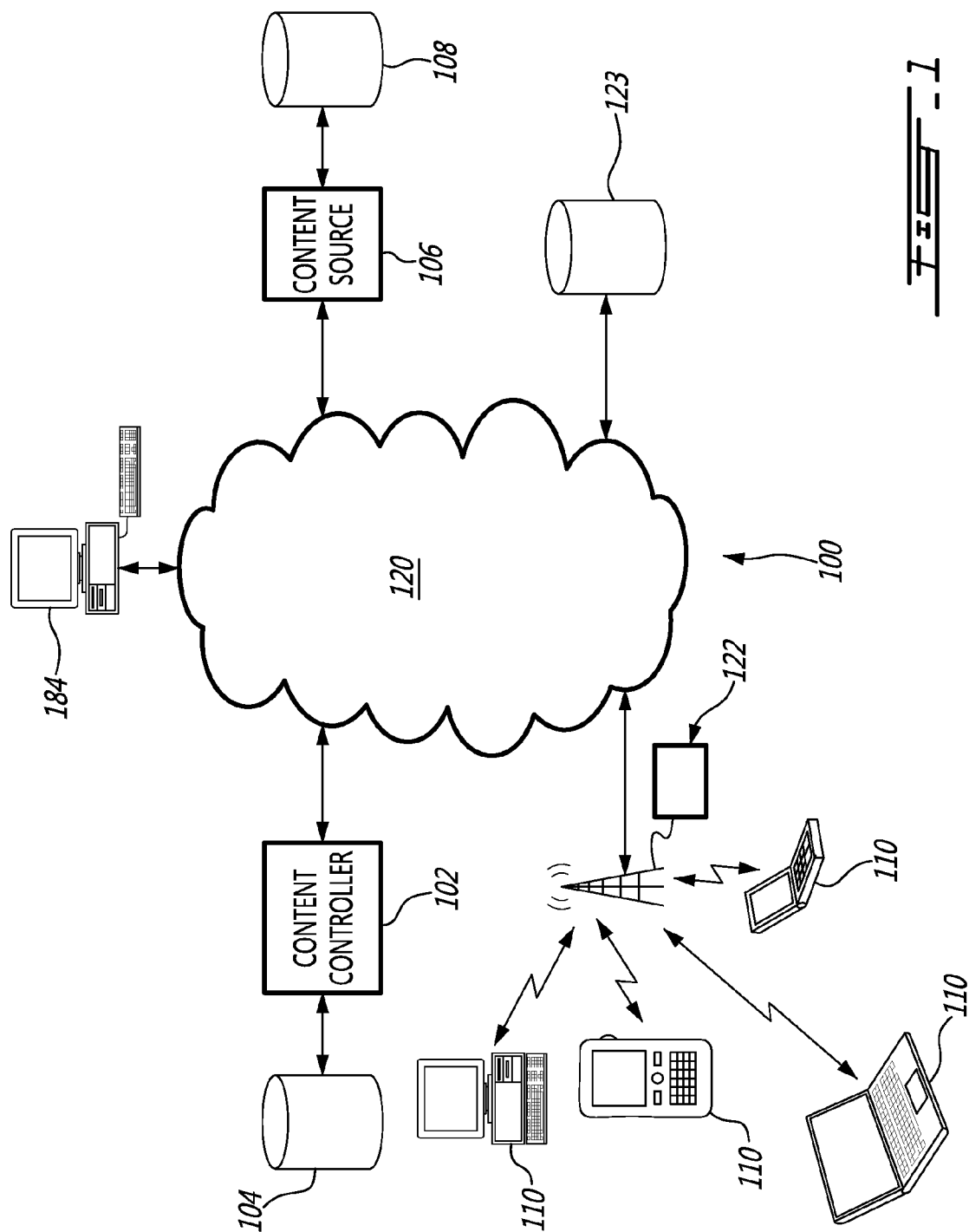

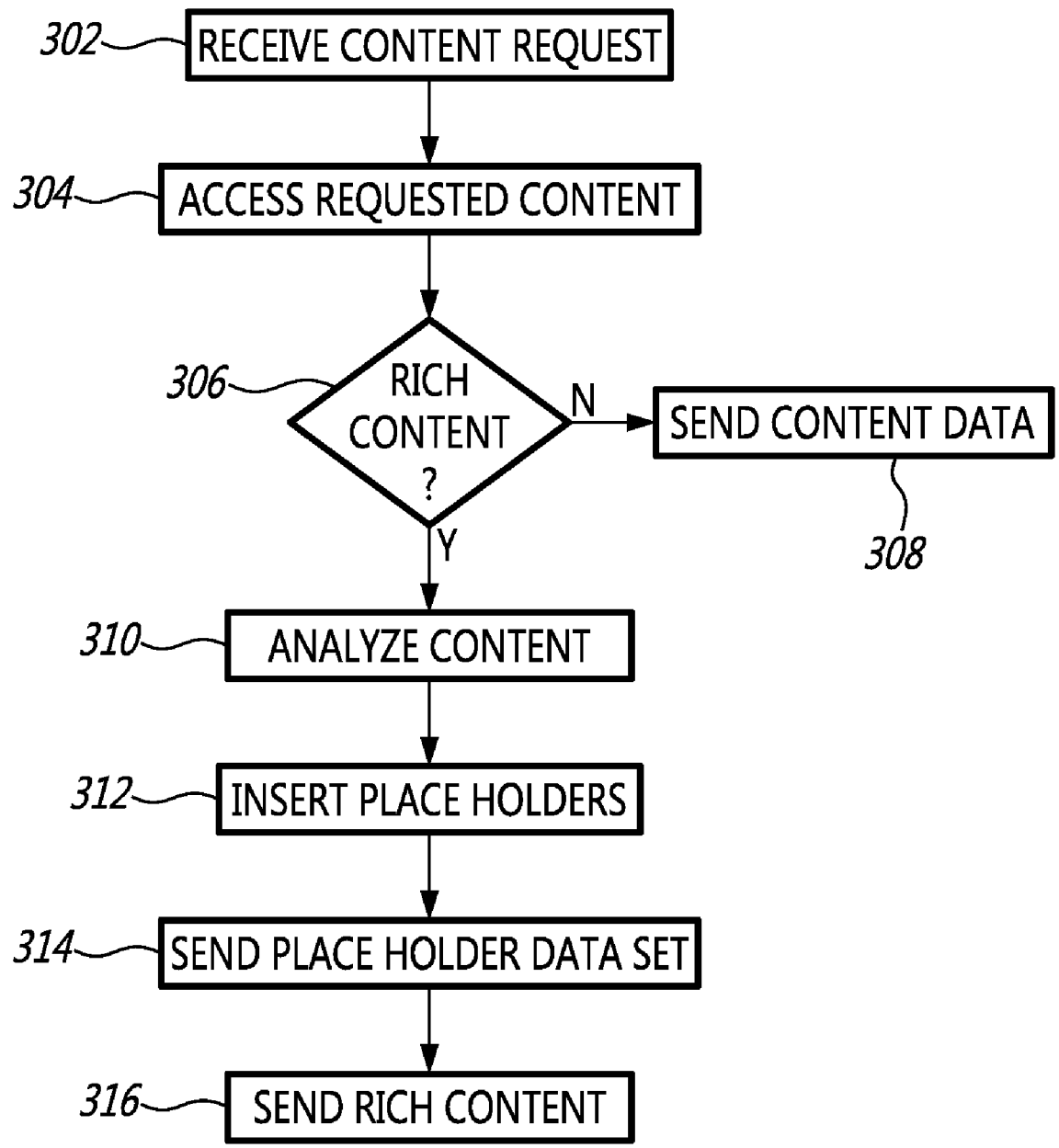

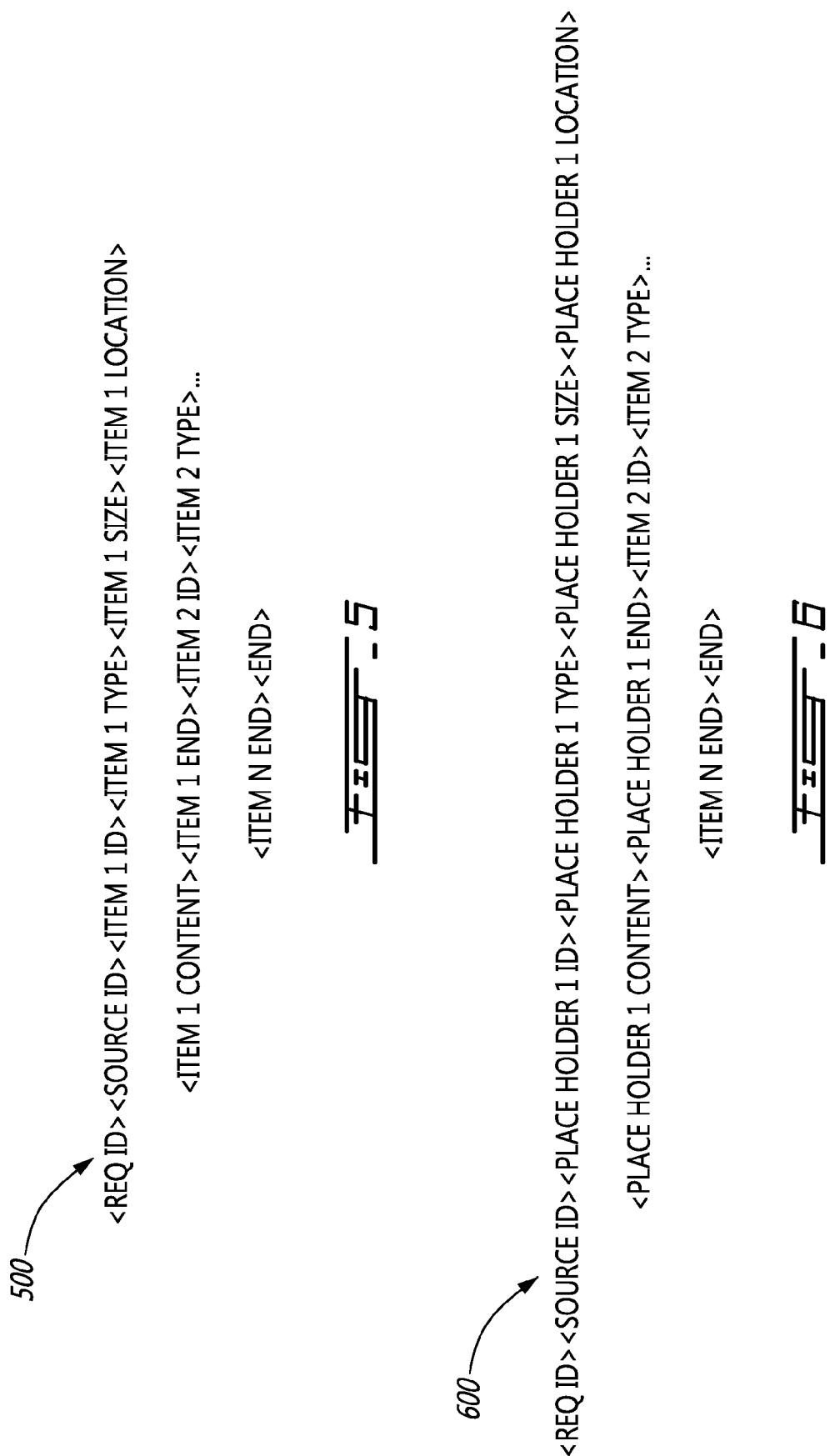

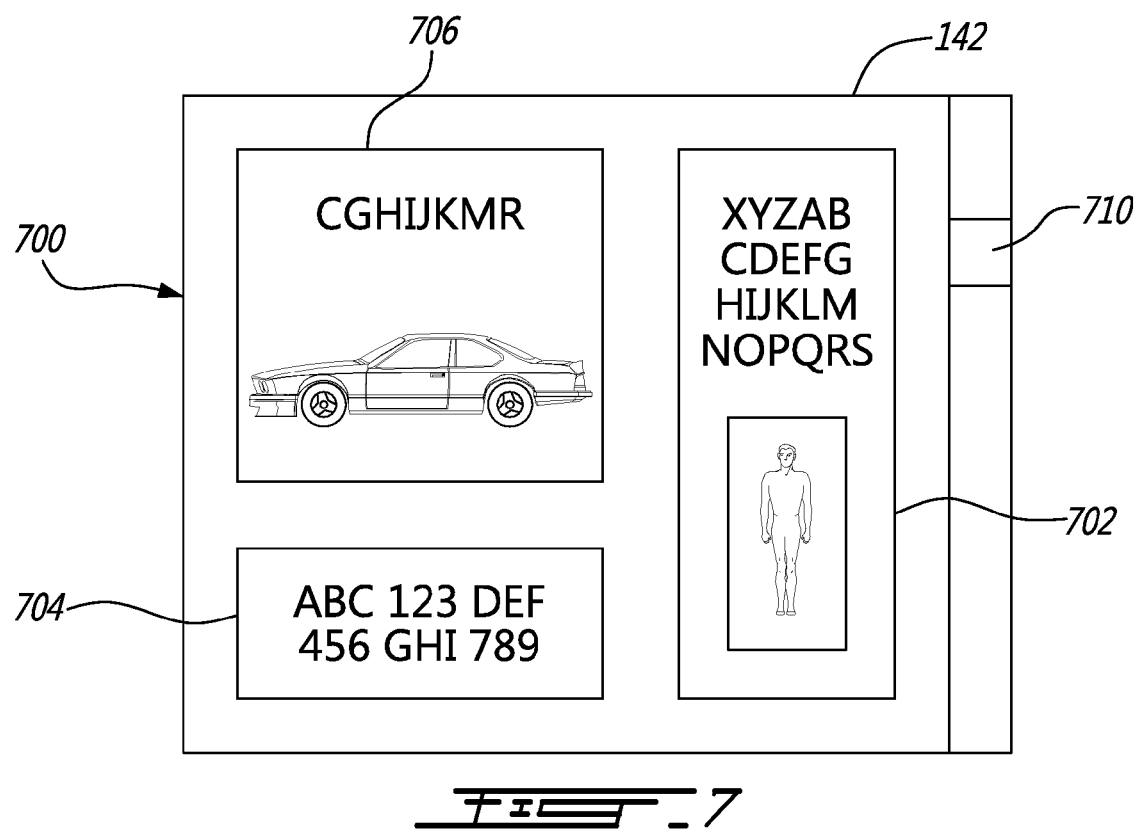
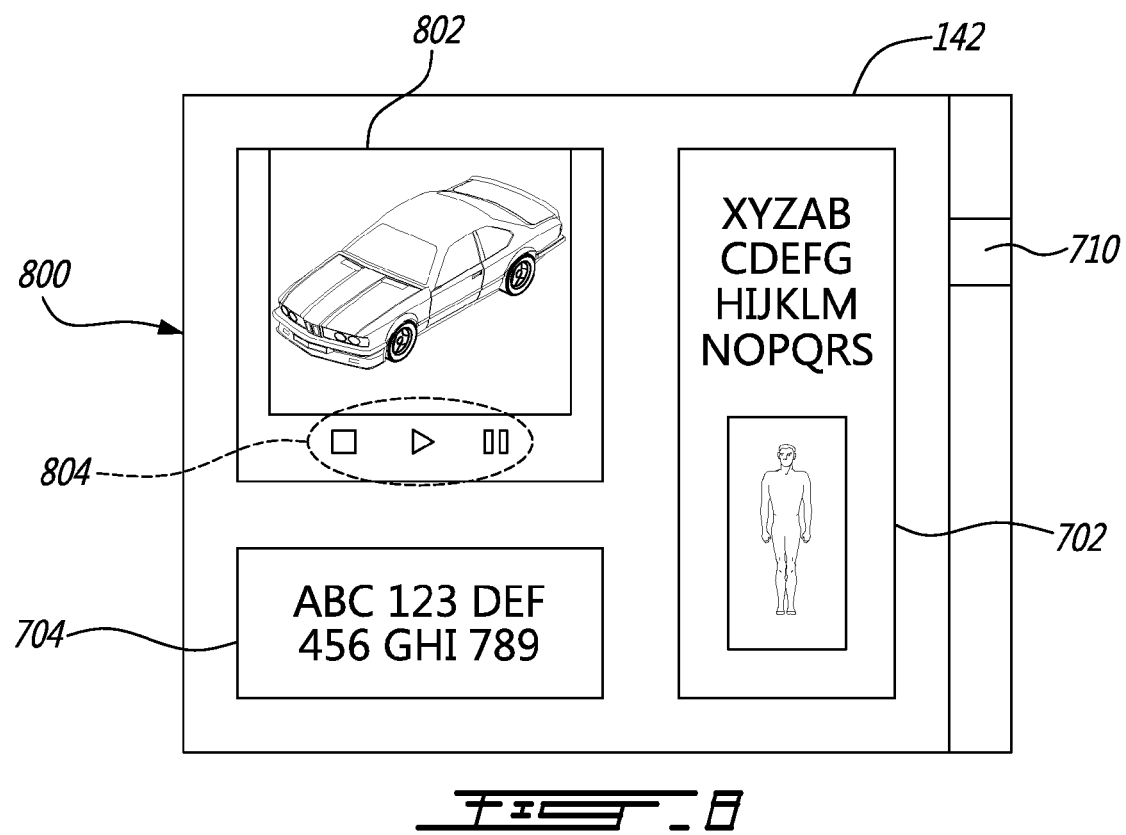

DISPLAY PLACEHOLDERS FOR RICH MEDIA CONTENT

FIELD

The present disclosure relates generally to electronic communications, and, more specifically, to methods, systems, and apparatus for improved processing of rich content on wireless communications devices.

BACKGROUND

Image, text, and other media content provided to electronic devices used to access information over communications networks such as the Internet can include both relatively rich content, such as video or audio data files, and relatively less-rich (sometimes referred to as "non-rich") content, such as text and still image files. A common problem with web browsing and other communications activities involved in accessing content through the use of electronic devices, and particularly handheld and other wireless communications devices, is that the resources available for processing, transmission, and display of video, audio, and other rich- or mixed-media content is limited. Downloading and display of such content on electronic devices is often slow due to network or bandwidth limitations, and can result both in inefficient use of computing resources and frustration to the user.

BRIEF DESCRIPTION OF THE DRAWINGS

Reference will now be made, by way of example, to the accompanying drawings which show example embodiments of the present application, and in which:

FIG. 1 shows, in block diagram form, an embodiment of a system suitable for use in controlling and managing communications in accordance with the disclosure herein.

FIG. 2A provides a generalized schematic diagram of an exterior of a handheld version of such a device. FIG. 2B provides a schematic block diagram of functional components of such a device.

FIG. 3 shows a schematic flow chart of an example embodiment of a method for displaying data on a wireless communications device in accordance with the disclosure.

FIGS. 5 and 6 show schematic diagrams of content data sets suitable for use in implementing systems and methods according to the disclosure.

FIGS. 7 and 8 show schematic diagrams of example data contents displayed on a wireless device in accordance with the disclosure.

Similar reference numerals are used in different figures to denote similar components.

DESCRIPTION OF EXAMPLE EMBODIMENTS

Figure 2B:
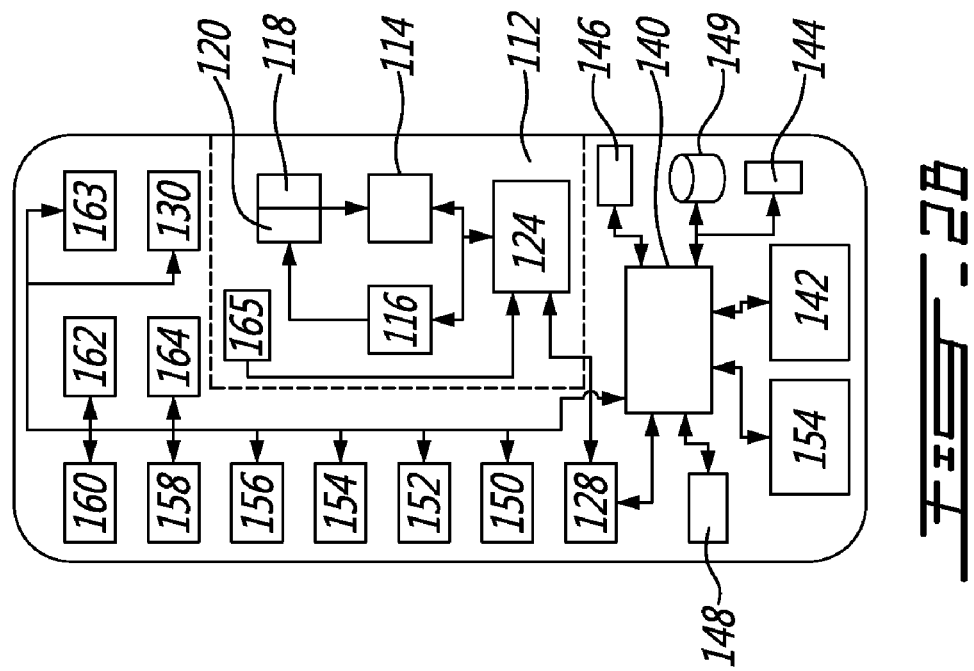
FIGS. 2a and 2b provide schematic diagrams of example wireless devices suitable for use in implementing methods and systems in accordance with the disclosure.

In one aspect, the present disclosure provides methods of displaying data on display screens of wireless communications devices. Such methods may be performed by one or more display content controllers and/or by one or more processors incorporated by wireless communications devices, and can comprise: in response to signals representing requests received from wireless communications devices for access to data representing display content comprising relatively rich and relatively non-rich media content, reviewing the requested data to determine an intended relative size and display location of at least one portion of the data which represents relatively rich media content; identifying in memory accessible by the display content server or other processor(s) substitute placeholder data, the substitute placeholder data representing display content that is relatively less rich than the rich media content; and providing for the requesting wireless device(s) at least one substitute display content data set configured to enable the wireless device(s) to display the non-rich media content and the substitute placeholder data on at least one display screen, with the substitute placeholder data displayed in the intended relative size and location of the rich media content. The relatively rich content may be downloaded or otherwise provided to the requesting wireless device(s) after the substitute display content data has been downloaded, or otherwise accessed by the wireless handheld device(s), and processing for display thereof has begun; and the relatively rich content may replace, and be displayed in the same relative size and location as, the placeholder data when downloading is complete.

As explained further herein, substitute placeholder data may represent content having any of a wide variety of logical relations (e.g., thematic, advertising, or artistic) to the rich media content for which it substitutes.

In various aspects and embodiments of systems and methods according to the disclosure, substitute placeholder data may be stored on the requesting wireless device(s) themselves, and/or on any of a wide variety of remote resources.

In further aspects, the present disclosure provides suitably-configured content controllers, wireless communications devices, and supporting software, programming, and/or machine-interpretable instruction sets adapted for implementing such methods and methods.

Other aspects of the disclosure will be apparent to those of ordinary skill in the art from a review of the following detailed description in conjunction with the drawings.

As will be readily appreciated by those skilled in the relevant arts, example embodiments of systems, devices, or programming or data structures according to the disclosure herein are not to be limited to any particular operating systems, device, server, or network architectures, data structures or protocols, or computer programming languages.

The present disclosure relates to the control and management of communications, including particularly the control and management of digital electronic data representing text, image, audio, video, and other types of content, which may include embedded metadata such as resource links and other hypertext, to be displayed on computer interface screens such as those comprised by wireless communications devices or other computer systems.

A particular challenge in control and management of digital data in electronic devices involves the downloading and display by such devices of content which includes both relatively rich content, such as audio, video, and/or other media content, and static content such as text and static images. In many cases, it can be advantageous to download and display less-rich content such as still images and text first, and relatively rapidly, without waiting for completion of downloading and/or display processing of richer content such as audio and/or video content. Thereafter, the richer content can be downloaded and displayed. This provides, for example, improved efficiency in the use of communications bandwidth resources. It can also allow a user of such content to begin using the first-displayed, relatively less rich content while waiting for the richer content to complete the downloading process.

It is known to download and display less-rich content pending completion of downloading and display processing of relatively rich content. However, a commonly-encountered problem in such download and display processing is that the format and size of relatively less-rich content which has been displayed first is often different than that to be used by the relatively richer content for which it is substituting, so that the relative sizing and formatting of a display must be changed upon completion of reception of the relatively richer content.

It can be advantageous to maintain the relative size, location, and formatting of first-displayed, relatively less rich content throughout the downloading and display of content comprising data sets of varying richness.

This disclosure describes systems, methods, and programming tools for providing placeholders while downloading rich media content, and populating the placeholder with mobile advertising of less-rich content, which is possibly locally stored, while the rich media is being downloaded, and replacing the mobile advertising with the true rich media content when available.

As further described below, determinations whether any given content data set is "rich" can be based on the amount of data, bandwidth, or other resources required to complete downloading, display, or other processing of a discrete data set and/or the amount of time or other system resources required to store, transmit, display, and/or otherwise process the content data. Such determinations can be based on a number of criteria, including for example the size of the rich media data set, the maximum available data transmission rate by the network (fast network v. slow network), the time it would take to download the rich media content, and/or type of media to be downloaded. For example files or other data sets of various types may be treated, as a default, as relatively rich or less-rich content—for example, .mpeg, Flash, or other file types commonly associated with audio and/or video content.

FIG. 1 shows, in block diagram form, an example system, generally designated 100, suitable for use in controlling and managing communications in accordance with the disclosure herein. In the example embodiment shown, system 100 includes at least one display content controller 102 with associated storage 104, at least one content source 106 with associated data storage or memory 108, and one or more electronic devices 110 which can for example include handheld wireless communications devices such as wireless telephones and/or palmtop devices such as BlackBerry® personal digital assistant (PDA) devices, and/or desktop, laptop, or other traditionally larger computing systems.

Display content controller(s) 102, which may, for example, be the primary service provider(s) or other communications controller(s) for electronic device(s) 110, manage(s) the retrieval of content on behalf of, and the provision of content to, electronic device(s) 110. Content retrieved by display content server(s) 102 may, for example, be requested by one or more wireless communications devices 110 through the use of suitably-configured command signals, retrieved by a responsible content controller 102 from one or more content source(s) 106, and passed to the requesting electronic device(s) 110 for display.

Display content controller(s) 102 may also, or alternatively, be implemented as a part of one or more requesting electronic devices 110.

Content source(s) 106 are network resources which provide, at the request of or on a push basis to other network resources, data representing text, image, audio, video, and/or other types of content for display on wireless communications device(s) and optionally wireline devices such as personal or other computer displays. Content source(s) 106 can, for example, be operated or otherwise controlled by advertisers or other sources of information, including for example any type of internet or other network web page(s). Content source(s) 106 may also, or alternatively, be implemented as a part of one or more requesting electronic devices 110.

In various example embodiments of the disclosed systems and methods, content controller(s) 102, and content source(s) 106, and electronic device(s) 110 are shown separately (as for example shown in FIG. 1) and are generally described separately because their functionality can be considered distinct, and it is contemplated that in many implementations they will in fact comprise separate, independently-controlled systems. However, in some alternate embodiments, any or all of such components or subsystems can be implemented as portions or aspects of the same systems.

As will be understood by those skilled in the relevant arts, content data provided by content source(s) 106 can include data of any one or more of a very wide number of types, including for example video, still image, text, hypertext, or other types. Data provided by content source(s) 106 can include data sets representing web pages or other files comprising data representing multiple types of content. A data set representing a single web page, for example, can comprise data representing one or more still images, video 'clips', text, and hypertext representing executable links to separate network resources. Such multiple types of data sets may be provided in single and/or separate files, and may be formatted according to any one or more of a wide variety of protocols, some of which are now known, and others of which will doubtless be developed hereafter. Such protocols can, for example, include .jpeg, .tiff, .gif, .doc, .pdf, .wav, .mpg, .mp4, .mpeg, .flv, .mp3, .wav and .avi protocols. Such data sets may also include data representing documents which include embedded large files, such as .pdf or powerpoint presentations with rich media content, or compilations of rich media content files.

As will be understood by those skilled in the relevant arts, content provided by source(s) 106 can include both relatively rich content, such as video and/or audio data files, and relatively non-rich content, such as text and still image files. Such persons will also understand that content source(s) 106 may or may not be controlled by the same entity as display content server(s) 102, and/or other components of system 100, and may be identical thereto or distinct therefrom.

One or more wireless base stations 122 can process communications between electronic device(s) 110 and content controller(s) 102. For example, as will be understood by those skilled in the relevant arts, one or more backhaul links may interconnect base station(s) 122 with controller(s) 102. One or more bearer paths, typically wireless, can be used to interconnect base station(s) 122 with wireless device(s) 110. Such interconnections can be based, for example, Global System for Mobile communications (GSM), General Packet Radio Service (GPRS), Enhanced Data Rates for GSM Evolution (EDGE), and the Third-generation mobile communication system (3G), Institute of Electrical and Electronic Engineers (IEEE)802.11 (WiFi) or other wireline or wireless protocols. Wireless base station(s) 122 can include any wireless communications relay systems suitable for use in implementing systems and methods according to this disclosure, including for example commercial server-grade cellular telephone system components and/or DSL modem devices for wireless LANs in homes or businesses.

Electronic device(s) 110 may include two-way mobile communications devices having at least voice and data wireless communication capabilities, including the capability to communicate with other computer systems such as other wireless and/or wireline embodiments of device(s) 110, content controller(s) 102, and content source(s) 106 and their associated components. Electronic device(s) 110 can, for example, include any handheld, palmtop, cellular or other voice/data communications devices suitable for use in implementing the systems and methods disclosed herein. In various embodiments electronic device(s) 110 can also comprise desktop, server, and or other computers or data processing systems. A wide variety of suitable devices currently exist, and doubtless others will hereafter be developed.

Depending on the functionality(ies) provided by such an electronic device 110, it may be referred to as, for example, a data messaging device, a two-way pager, a cellular telephone with data messaging capabilities, a wireless Internet appliance, a data communication device (with or without telephony capabilities), a clamshell device, a personal computer, or a flip-phone. Electronic device(s) 110 may communicate with any one of a plurality of fixed transceiver stations, including for example, wireless base station(s) 122 and their associated components, within their geographic coverage area(s).

Figure 2A:
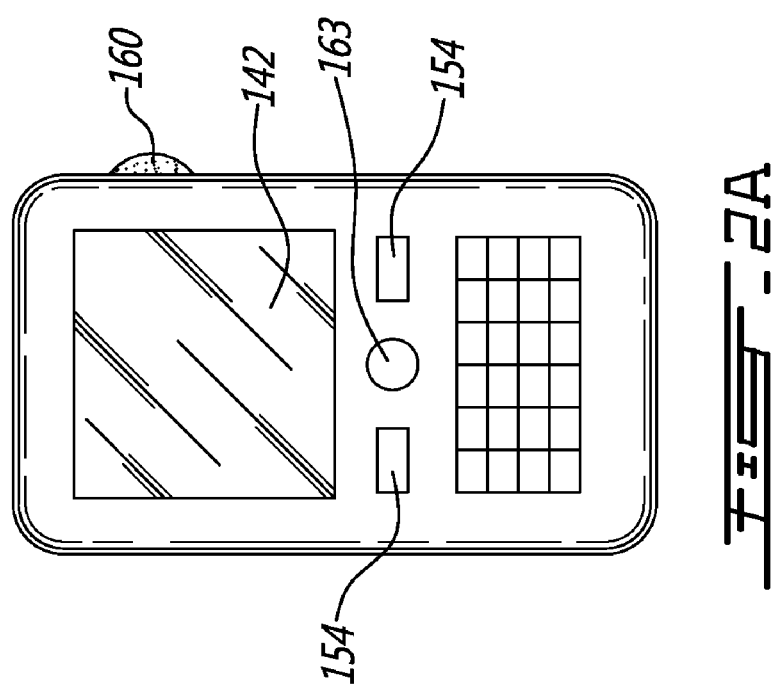

As shown in FIGS. 2A and 2B, an electronic device 110 suitable for use in implementing the systems and methods disclosed herein may incorporate one or more communications subsystems 112, which can for example include one or more receivers 114, transmitters 116, and/or associated components, such as one or more antenna elements 118 and 120 and one or more processing modules such as a digital signal processor (DSP) 124. In various embodiments, antenna elements 118 and 120 may be embedded within or otherwise internal to the wireless device 110. As will be apparent to those skilled in the relevant arts, the particular design of the communications subsystem(s) 112 will depend, in part, on the system(s), such as content server(s) 102, content source(s) 106, and the network(s) 120, with which a particular device 110 is intended to communicate.

An electronic device 110 can include one or more microprocessors 140 for control of the overall operation of the device 110. For example, under control of microprocessor(s) 140 communication functions, including at least data and voice communications, may performed through the communication subsystem(s) 112. Microprocessor(s) 140 may also interact with additional device subsystems such as modem 128, primary display 142, and memories such as flash memory 144, random access memory (RAM) 146, read-only memory (ROM) 148, drive or other non-volatile read/write memory(ies) 149, auxiliary input/output (I/O) subsystems 150, data port(s) such as Universal Serial Bus (USB) port 152, keyboard or keypad 154, speaker or audio port(s) 156 for connecting to, for example a set of headphones or an earpiece, microphone 158, clickable thumbwheel or thumbwheel 160, open/close sensor 161, short-range communications subsystem 162, trackball 163, global positioning system(s) (GPS(s)) 165, and any other device subsystem(s) generally designated as 164. Short range subsystem(s) 162 can comprise, for example, any one or more radio-frequency identification (RFID) devices, Bluetooth-protocol enabled devices, wireless networking communications subsystems, conforming for example to IEEE 802.11 standards such as one or more of 802.11b, 802.11 g, and/or 802.11. and/or infrared, laser, or other optical systems for communicating with other, suitably-configured devices.

Some of the components and subsystems shown in FIG. 2B may perform communication-related functions, whereas others may provide or control "resident" or on-device functions. Some subsystems or components, such as keypad 154, primary display 142, secondary display 143, the clickable thumbwheel 160, for example, may be used for both communication-related input/output functions, such as dialing or receiving wireless telephone calls, displaying notifications and/or entering text messages for transmission through, for example, a PLMN and/or other portion of network 120, and executing input/output functions for device-resident functions such as calendars, calculators, or task lists. Operating system software used by the microprocessor 140 cam be stored in persistent memory(ies) such flash memory(ies) 144, ROM(s) 148, or other devices. Those skilled in the relevant arts will appreciate that corresponding operating systems, specific device applications, and/or portions thereof, may be temporarily loaded into volatile storage such as a RAM 146.

Media and other applications wholly or partially resident on electronic device(s) 110 may have the ability to implement sending and receiving of data signals via network(s) 120 via communications established, for example, via serial port(s) 152 and/or a short-range communications subsystem(s) 162. Additional applications and data sets (including, for example, data sets including rich media content) may also be up- or downloaded onto or from electronic device(s) 110 through, for example, network(s) 120 via auxiliary I/O subsystem(s) 150, serial port(s) 152, short-range communications subsystem(s) 162, and/or any other suitable subsystem(s) 164, and installed in RAM(s) 146 or other non-volatile stores such as ROM(s) 148 for execution by the microprocessor 140. Such flexibility in application installation increases the functionality and data processing capabilities of the electronic device(s) 110 and may provide enhanced on-device functions, communication-related functions, or both. For example, secure communications applications may enable electronic commerce functions and other such financial transactions to be performed using electronic device(s) 110 processing rich and other media content such as web pages representing interactive web applications.

For example, a user of an electronic device 110 can request access to a web page or other content stored in memory 108 controlled by a content source 106. Where the electronic device 110 and the content controller 102 are not the same device, such request can be routed from the requesting electronic device 110 through network 120, which can for example include wireless communications components 122 such as antennas, receivers, transmitters, routers, and switching equipment, to display content server 102. Display content server 102 can interpret the request, identify the corresponding source(s) 106 of the content requested by the device 110, and can initiate a file transfer session with the source 106 to obtain the desired content. Display content server 102 can then format the content as needed for display by the requesting device 110, and forward the content to the device 110 for display.

In a data communication mode, signals representing information such as text messages, e-mail messages, media files, or Web page downloads received by an electronic device 110 can be processed by a communication subsystem 112 and input to the microprocessor 140. The microprocessor 140 can further process the signal for output to the primary display 142, secondary display 143, and/or auxiliary I/O device(s) 150. A user of an electronic device 110 may also compose data sets processable as e-mail or other messages, which may, for example, include embedded rich media content such as video data files, using a keypad 154, clickable thumbwheel 160, and/or trackball 163 in conjunction with the primary display 142 and possibly the auxiliary I/O device 150.

Keypad(s) 154 maybe include any one or more of complete or abbreviated alphanumeric keypad(s), telephone-type keypad(s), and/or special function keys, such as dedicated menu or execution keys. Composed items consisting of suitably-formatted data sets may be processed by components such as DSP(s) 124 and transmitted through the communication subsystem(s) 112 and/or short range communication subsystem(s) 162 in the form of suitably-formatted signal sets.

In processing communications comprising audio components, such as video or audio streams or other rich-media content, operations of an electronic device 110 may be similar, with suitably-processed signals being output to speaker(s) and/or audio port(s) 156, and signals for transmission being generated by transducer(s) such as microphone(s) 158. Alternative voice and/or audio I/O subsystems, such as a voice message recording subsystem, may also be implemented on the electronic device 110. Although voice or audio signal output is typically accomplished primarily through a speaker and/or audio port 156, the primary display 142 or the secondary display 143 may also be used to provide an indication of the identity of a calling party or the communication type, duration of a voice call, video display, and/or other voice-call or rich-media related information. Stereo headphones or an earpiece may also be used in place of the speaker 156.

Modem device(s) 128 may, for example, comprise one or more low-bandwidth modems for modulating and demodulating data signals to be transmitted over voice and/or data channel(s). For example, such modem can include high speed, low-bandwidth modems such as, for example, 3GPP modems (TS 26.267 or TS 26.268). Such modem may also comprise coder/decoders (also referred to as codecs).

Global Positioning System (GPS) module(s) 165 can provide both the user of a device 110, content controller(s) 102, and optionally any other network resources 108, etc., with location-based services of the corresponding electronic device(s) 110.

Electronic device(s) 110 may also include one or more battery interfaces for receiving one or more rechargeable batteries. Battery(ies) can provide electrical power to some or all of the electrical circuitry in a device 110.

Thus electronic device(s) 110 can for example include mobile telecommunications devices equipped for cellular and other types of digital and/or analog communication with each other and with other systems or resources, including for example content controller(s) 102 and content source(s) 106, through any one or more of a wide variety of wireless and wireline network(s) 120, which may for example include one or more public land mobile networks (PLMNs), wireless local and/or wide-area networks (WL/WANs), the Internet and/or other public and/or private communications networks, including for example the public switched telephone network (PSTN). Electronic device(s) 110 may, for example, comprise dual-mode handheld devices capable of both cellular and WLAN communications.

Electronic devices 110 may be configured to send and receive communication signals to and from, for example, a content controller 102 through, for example, the public land mobile network (PLMN) and/or one or more wireless local area networks (WLANs) comprised by communications network(s) 120, in accordance with one or more wireless protocols, including any one or more of GSM, GPRS, CDMA, EDGE, UMTS, EvDO, HSPA, 3GPP, and a variety of others. It will be appreciated by those skilled in the relevant arts that a wireless device 110 may roam within a PLMN and/or across multiple PLMNs, as its user moves.

Rich media and other data and/or command signals received by an antenna 118 of a wireless device 110 may be input to a receiver 114, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed by the DSP 124. Outgoing signals to be processed by a DSP 124 prior to transmission by implementation, for example, of modulation and encoding processes. Such DSP-processed signals may be input to the transmitter 116 for digital-to-analog (D/A) conversion, frequency up conversion, filtering, amplification, and transmission via the antenna 120. In addition to processing of communication signals, a DSP 124 can also provide for receiver and transmitter control. For example, gains applied to communication signals in the receiver 114 and the transmitter 116 may be adaptively controlled through automatic gain control algorithms implemented in or by a DSP 124.

In various embodiments, access by one or more electronic device(s) 110 to all or any portions of network(s) 120, or resources communicatively linked thereto, may be associated by, for example, one or more content controllers 102, with a subscriber or user of the electronic device(s) 110 via memory modules, such as memory module 130, which may for example include a Subscriber Identity Module (SIM) card for use in a GSM network or a Universal Subscriber Identity Module (USIM) card for use in a Universal Mobile Telecommunication System (UMTS). Such a SIM card may be inserted in or connected to a suitably-configured interface 132 of the corresponding electronic device 110. Alternatively, or in addition, the wireless handheld telephony device 11 may have an integrated identity module for use with systems such as Code Division Multiple Access (CDMA) systems.

As will be well understood by those skilled in the relevant arts, rich-media and other communications originated and/or received by electronic device(s) 110 can be sent to or received from wireline devices such as PCs 110 or other devices 184 working through the use of systems and components described above. Rich- and non-rich media data content and command signals processed according to the disclosure may also be provided to and received from such devices 184.

Like other components of systems 100 disclosed herein, content controllers 102, content sources 106, and other controllers, servers, and network resources according to the disclosure may be implemented using any digital automatic data and/or signal processing devices, and software and/or other executable instruction sets or devices, suitable for use in accomplishing the purposes herein. As will be understood by those skilled in the relevant arts, a large number and variety of suitable systems and components are now available, and doubtless will hereafter be developed. For example, content controller(s) 102 and source(s) 106 may comprise suitably-configured server-class, mainframe, desktop, palmtop, or other machines. Content controller(s) 102 and source(s) may, for example, be based on any of a number of well-known server environments, including modules that house one or more central processing units, volatile memory (e.g. random access memory), persistent memory (e.g. hard disk devices) and network interfaces to allow the controller(s) 104 and source(s) 106 server to communicate over network 120 and with wireless base station 122. For example, controller(s) 102 and/or source(s) 106 can comprise Sun Fire V480s running UNIX operating systems, from Sun Microsystems, Inc. of Palo Alto Calif., and having multiple central processing units, each operating at nine-hundred megahertz, or more, and having many gigabytes of random access memory. However, it is to be emphasized that such architectures are merely exemplary, and a vast array of other types of computing environments for the various components of system 100 are contemplated. Content server(s) 102, source(s) 106, and base station(s) 122 can be based on common or different computing environments.

FIG. 3 shows a schematic flow chart of an embodiment of an example method 300 for displaying data on an electronic communications device in accordance with the disclosure. Method 300 is suitable for implementation using, for example, a system 100, or various components thereof, as disclosed herein.

Figure 4:
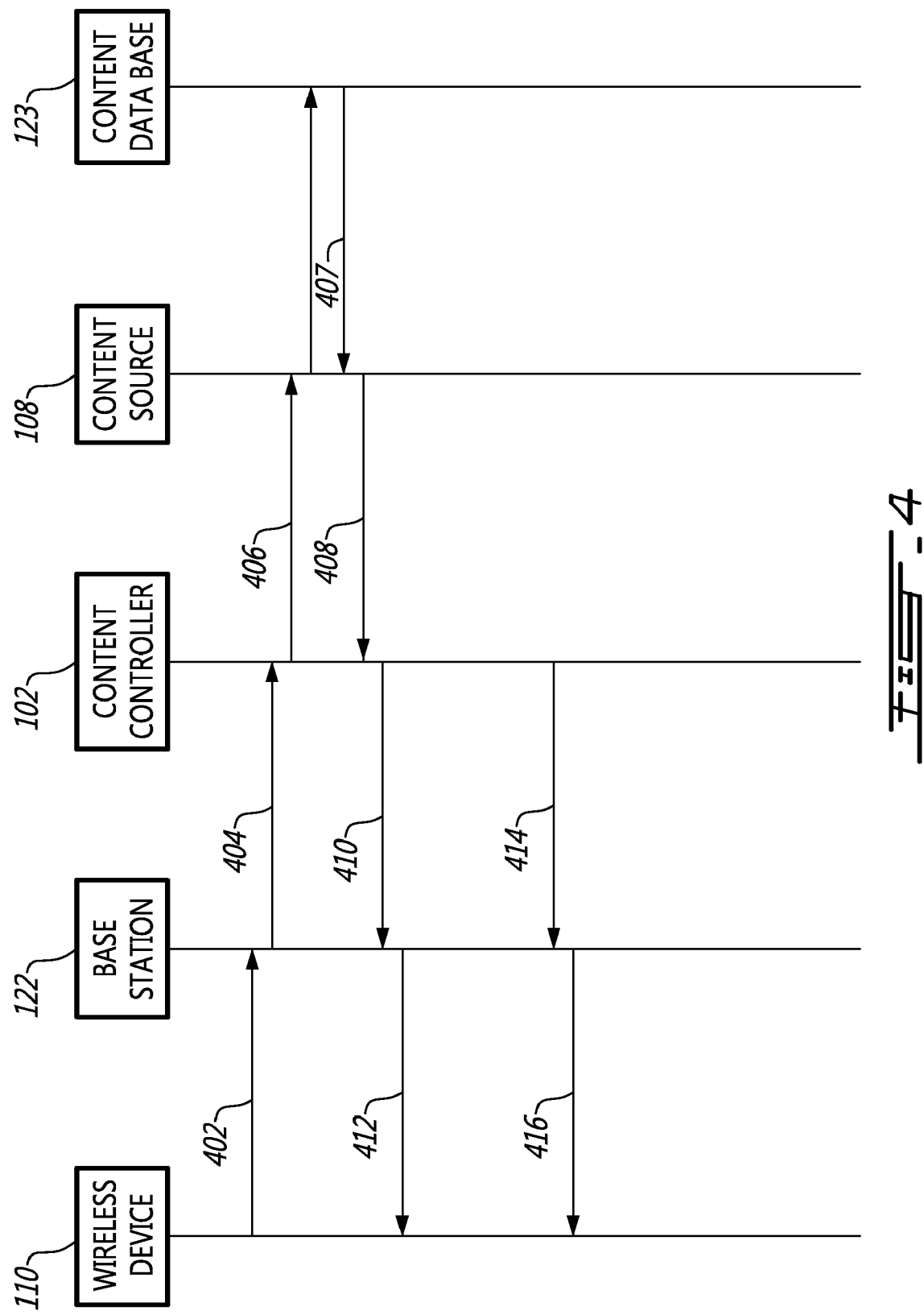
FIG. 4 shows a schematic signaling diagram of an example embodiment of a process for displaying data on a wireless communications device in accordance with the disclosure.

For purposes of the present disclosure, method 300 can be considered to begin at 302 with reception of a request for transmission of content. For example, a user of an electronic device 110, using one or more of input devices 154, 163, etc., can build a command signal data set representing a request for display on a display 142 of his/her electronic device 110 of content representing a web page stored in one or more of data stores 108, 123 controlled by one or more of content source(s) 106. Upon entry of a suitable execution command, such user can cause his/her electronic device to transmit the command signal data set representing the request to the responsible content controller(s) 102. As shown in FIG. 4, such request may be transmitted originally (402) to a local or otherwise responsible wireless base station 122 and relayed (404) by the wireless base station 122 to the content controller(s) 102 addressed by the command signal.

Thus, for example, a user of an electronic device 110 may request access to one or more web pages or other content, which may include text, image, audio, video, and other types of display content representing, for example, web pages, news items, music or other audio or video content, and/or advertisements.

Upon receipt and interpretation of the request for delivery of data content, at 304 the content controller(s) 102 can access the requested content. For example, having parsed and interpreted the command signal data set received at 404, the content controller(s) 102 can extract a target address representing a uniform resource locator (URL) associated with one or more content source(s) 106 controlling access to the requested content, and at 406 such content controller(s) 102 can transmit to the corresponding content source(s) 106 one or more read/write requests identifying the desired content, which, as shown at 408, can be pulled by or pushed to the requesting content controller(s) 102 by the content source(s) 106. For example, the responding content source(s) 106 can access data files or other data sets representing the requested content data in one or more of data stores 108 controlled by the content source(s) 106 and/or in independent data store(s) 123, can assemble (407) and compile the requested content data into one or more content data sets, and can write such content data sets to the requesting content controller(s) 102 (408).

Transmission of content data and other data sets, including command signal data sets, between network resources 102, 106, 122, 110, etc., can be accomplished by any means, and using any signal protocols, suitable for use in implementing the systems and methods disclosed herein. For example, known packet switching methods, such as those used in conjunction with the Internet and other distributed processing systems, may be used.

As previously noted, in various embodiments systems and methods according to the disclosure content controller(s) 102 and content source(s) 106 can be the same systems. While they are generally shown and described separately herein, such need not be the case, either with respect to control or physical identity.

Referring back to FIG. 3, at 306 content controller(s) 102, having received or otherwise obtained data set(s) representing the requested content, can parse the received content data to determine whether the received content comprises any relatively rich content, such as audio and/or video content. For example, received content can be reviewed to determine whether any .wav, .mpg, .mpeg, .avi, or other content generally considered to be relatively rich is included in the content intended to be delivered to the requesting electronic device 110.

A determination at 306 whether received content comprises relatively rich content can be based, for example, on known, or the type(s) or identity(ies) of expected transmission resources, consideration of which can, for example, include known, expected, and/or desired content types, an indication such as a tag associated with the content to identify the content as rich content; network or device processing rates (bandwidth); time constraints for data processing; and/or processor loads, demands, and/or power consumption for any of the various processors or other components involved processes of data retrieval, transmission, reception, and display processing. Determinations whether a given data set is "rich" enough to be discriminated at 306 can set based on data type, system policy, or physical constraints of the electronic device 110 or the operating network.

If it is determined at 306 that no relatively rich content is included in a received data set, at 308 the content can be transmitted to or otherwise processed for display by the requesting electronic device(s) 110. For example, at 410 a data signal set representing the requested content can be forwarded to a responsible wireless base station 122 and transmitted thereby to the requesting electronic device(s) 110. Thereafter the requesting device(s) 110 can process the received data, as for example described herein, and cause it to be displayed on one or more output displays 142.

If it is determined at 306 that received content data comprises relatively rich content, at 310 content controller(s) can analyze the received data to determine display parameters intended for or otherwise associated with the rich content data, including for example the intended relative size and location on the display device(s) 142 of the rich content when displayed on the electronic device(s) 110. For example, web pages and other multi-media content displays often comprise both text and still and/or video image content, or other rich content. A content controller 102 analyzing a received data set can review the data set for, for example, embedded java script or hyper-text mark-up language or other command or control strings, or characters, indicating the intended relative size and/or location of various portions of the rich data content in an intended display on a device 142. Using such intended display parameters, such content controller(s) 102 can identify one or more substitute, relatively non-rich data sets (i.e., "placeholder" data sets) to be initially (i.e. temporarily) provided to the requesting electronic device(s) 110, for display processing while the identified relatively rich content is downloaded to the requesting device(s) 110.

Such placeholder data sets can advantageously be selected or sized to occupy the same display space, and/or an be located to occupy the same display location, as the relatively-rich content for which they will substitute. An example of a method for providing appropriately-sized and located placeholder content can include generating display parameters suitable for providing on the display an initially empty frame, sized and/or located to match the actual rich content, and temporarily the frame with content such as data representing mobile advertising. Accordingly, the empty placeholder frame can be thought of as the first-displayed content, the replacement (e.g., advertising) content the second-displayed content, and the requested, relatively rich content a third display set.

It is noted that among the many advantages offered by systems, methods, and programming devices according to the disclosure herein is the provision of a placeholder or empty frame so that the page is properly sized at the outset, and that the user is not confused where in the page he started to read when the rich content is suddenly displayed and the page is resized. This empty frame may be temporarily populated with any suitable content, including for example mobile advertising. A further advantage is that the user is enabled to view some content (i.e., mobile advertising) when real rich content is being downloaded, rather than nothing.

Temporarily displayed content can be stored in and/or retrieved from memory on the device, and/or pushed to the requesting electronic device(s) 110 (perhaps at no cost to the users).

Hypertext markup language (HTML) and other syntaxes provide ways to specify the location, width, height, source, and alignment of a particular image via devices such as IMG tags. This information, along with other tags, can be used when rendering a webpage to ensure the pictures are placed in a desired size and in an intended position on the display. During the rendering process, for example, a webpage may change drastically when an image is inserted based on its properties as it can require a complete shift of all the text on the screen.

Thus, for example, a content controller 102, having identified rich content and its intended relative size(s) and location (s), can identify in one or more of data stores 104, 108, 123, and/or memories 144, 146, 148, and/or 149 relatively less rich content suitable for use as placeholder(s) for such rich content. For example, a video and/or audio string included within the content requested at 302 can be temporarily substituted by text and/or one or more still images stored in any volatile or non-volatile memory accessible by controller(s) 102 and/or 140.

As a further example, in controlling downloading and display of requested content a processor 140 of a wireless handheld or other electronic device 110, can identify in one or more of data stores 104, 108, 123, and/or memories 144, 146, 148, and/or 149 relatively less rich content suitable for use as placeholder(s) for such rich content. For example, a video and/or audio string included within the content requested at 302 can be temporarily substituted by text and/or one or more still images stored in any volatile or non-volatile memory accessible by controller(s) 102 and/or 140.

Thus, for example, a video data set intended to be displayed within a web page accessed by an electronic device 110 can be temporarily replaced with placeholder still image content displayed in the same relative size and location.

To display content in a given size and relative location within a displayed content data set can mean to place such content in a desired relative size and juxtaposition with respect to other items displayed at the same time. For example, as is well known, the relative sizes and locations of concurrently-displayed content items do not change as a user of a device causes the display to shift by, for example, scrolling through or otherwise navigating within displayed content.

Among the many advantages offered by systems and methods according to the disclosure is the use of logically, thematically- or otherwise-related placeholder content to substitute temporarily for rich media content while the rich media content is downloaded to a requesting device 110. For example, if a web page intended to include audio-visual rich content related to an automobile, relatively less-rich content representing a still image of an automobile or other related service (e.g. automobile advertisement) or product provided by the same source (e.g., manufacturer or distributor) can be used as a placeholder pending completion of downloading of the audio-visual content. As will be appreciated by those skilled in the relevant arts, the use of thematically-related placeholder content can have significant advantages in educational, advertising, news-reporting, and other applications.

As an example, a content data set comprising rich media content requested by a user of a device 110 can, as shown in FIG. 5, comprise data records or items representing:

<REQ ID>—the network address (e.g., URL) of the requesting resource(s) 110 and/or 102

<SOURCE ID>—the network address (e.g., URL) of the targeted content resource(s) 106, 123, etc.

<ITEM 1 ID>—identifier uniquely associated with a first data set or record associated with the requested content (e.g., a first text segment or file name)<

ITEM 1 Type>—a type identifier associated with such first data set (e.g., type "text")<

ITEM 1 Location>—an absolute or relative intended location for the first data set in the displayed data content (e.g, a java script or HTML instruction suitable for relative placement of the data set)<

ITEM 1 Size>—an absolute or relative intended size for the first data set in the displayed data content (e.g, a java script or HTML instruction suitable for relative sizing of the data set)<

ITEM 1 Content>—suitably-formatted content associated with the first requested data set (e.g., relatively rich data formatted to the .mpeg, .mpg, .avi, or .wav protocols)<

ITEM 1 End>—a marker denoting the end of the first content data set (e.g., a java script of HTML end or record identifier)

As will be appreciated by those skilled in the relevant arts, data records or sets associated with further items in the requested data set are shown in the figure and designated as ITEM 2/ITEM N records or items. Second and subsequent items can be of the same or different types as ITEM 1. For example, any of ITEMs 1 . . . N can be of any type suitable for use in implementing the systems and methods described herein. A large number of such data record types are now known, and doubtless others will hereafter be developed.

As will further be appreciated by those skilled in the relevant arts, any of Item 1 . . . Item N CONTENT records can comprise the actual data content or identifiers suitable for use as referring calls to separate data files, records, or items, to be separately retrieved by any of the various processors processing requested content data strings, from any one or more resources, e.g., 102, 104, 106, 108, 123, 110 available via network 120.

Thus, as mentioned, at 312 a data set 500 received or otherwise accessed by a content controller 102 at 304, 408 in response to a request can be processed by such controller(s) 102 (including for example a processor(s) 140) to substitute relatively less-rich content for relatively rich content for initial delivery at 314, 412 as one or more placeholder data sets to a requesting device 110. Substitutions can be made by, for example, replacing relatively-rich content identifiers with relatively less-rich placeholder content identifiers, and merging such content with other, relatively-less rich content to be retained in the initial display content data set. In many embodiments or processes according to this disclosure, a copy of the original data set 500 will be retained in memory controlled by the content controller(s) 102, for subsequent transmission to the requesting wireless device(s).

A schematic representation of such an example of a substitute or placeholder data set 600 is shown in FIG. 6. In the embodiment shown in FIG. 6, a content controller 102 has replaced ITEM 1 from, for example, data set 500 of FIG. 5 data set representing a placeholder data set. In the embodiment shown in FIG. 6, placeholder data set 600 comprises a number of data records or items, including:

- <REQ ID>—the network address (e.g., URL) of the requesting resource(s) 110 and/or 102
- <SOURCE ID>—the network address (e.g., URL) of the targeted content resource(s) 106, 123, etc. for the substitute "placeholder" content
- <PLACEHOLDER 1 ID>—identifier uniquely associated with the placeholder data set or record to be substituted for relatively rich content data set corresponding to ITEM 1 of FIG. 500
- <PLACEHOLDER 1 Type>—a type identifier associated with such first placeholder data set (may correspond or otherwise be logically related to the type of the item to be substituted e.g., type "text" for an item to temporarily replace ITEM 1 of FIG. 5)
- <PLACEHOLDER 1 Location>—an absolute or relative intended location for the first placeholder data set in the initially-displayed data content (e.g, the same absolute or relative location as the replaced ITEM 1 of FIG. 5)<
- PLACEHOLDER 1 Size>—an absolute or relative intended size for the first placeholder data set in the initially-displayed data content (e.g, the same absolute or relative size as the replaced ITEM 1 of FIG. 5)<
- PLACEHOLDER Content>—suitably-formatted content associated with the first placeholder data set (e.g., relatively less-rich data formatted according to the .jpeg, .pdf, or .txt protocols)<
- PLACEHOLDER 1 End>—a marker denoting the end of the first placeholder data set (e.g., a java script of HTML end or record identifier)

As will be appreciated by those skilled in the relevant arts, data records or sets associated with further items in the requested data set are shown in the figure and designated as ITEM 2 . . . ITEM N records or items. In the example shown, Items 2 . . . N are represent relatively less rich content, and are not replaced by placeholder content. Of course, the mixture of relatively-rich content to be replaced, and relatively non-rich content to be sent in an initial data set, are for purposes of this disclosure dependent solely upon the design of the multi-richness content to be transmitted and displayed, and the determinations made according to system bandwidth, user time constraints, etc., described herein.

As will be appreciated by those skilled in the relevant arts, in embodiments of systems and methods according to this disclosure placeholders comprising content which is logically-, thematically-, or otherwise-related to relatively rich content to be replaced in initial transmission to a requesting device 110 can be identified by, for example, cross-indexing or cross-referencing requested, rich content and suitable or desired placeholder content using suitable values for the "TYPE" identifiers included in the data sets 500, 600.

One of the many advantages offered by the systems and methods disclosed herein is that placeholder content may be stored in any convenient or otherwise advantageous memory storage. For example, as noted above, such placeholder content may be provided by and retrieved from either of content source(s) 106, 100 or content controller(s) 102, 110 or by independent source(s) 123. Such content may also be previously stored upon, and accessed from, any of the various memory structures provided on the requesting electronic device(s) 110 themselves. For example, as mentioned above, such placeholder content may be stored or pre-loaded in any of memories 144, 146, 148, and/or 149. This may, for example, enable one or more content controller(s) 102, 110 or other systems authorized to administer a device 110 to control placeholder content to be used in displaying data on the device 110. For example, a variety of thematically diverse content sets, of varying intended display sizes, may be stored on a device 110. The variety and content of placeholder content stored on the device(s) 110 may periodically be updated or otherwise changed by, for example, downloading new content and over-writing older content. For example, such updating or changing of placeholder content may be done at night, or at other times of off-peak communications traffic, when additional bandwidth is available or transmission costs and/or efficiency are otherwise advantageous.

When content data files stored on the requesting device(s) 110 are to be used as placeholder data, corresponding placeholder data sets 600 may, as will be appreciated by those skilled in the relevant arts, comprise identifiers such as machine executable tags, embedded URL codes, or other metadata, useable by the requesting wireless device(s) to access such separately-stored data sets in displaying the non-rich media content. Such tags, codes, or other metadata may refer to and cause content to be retrieved from any suitable content sources 110, 104, 102, 106, 108, 123, etc.

After suitable placeholder content has been inserted at 312 into a placeholder data set 600, at 314 the placeholder content 600 may be transmitted (using for example push and/or pull procedures) to the requesting wireless device(s) 110 and processed for display thereon. For example, at 410, 412 using suitable packet-switching or other methods the placeholder content 600 may be transmitted first to a corresponding base station 122 and then to a requesting wireless device 110.

Upon receipt of placeholder content 600 at 412, the requesting wireless device(s) can process the placeholder content, as for example described herein, and produce an initial display 700 as shown in FIG. 7. In the example shown in FIG. 7, a placeholder content data set comprising data representing three content items 702, 704, 706 has been processed by a device 110 and displayed on a display screen 142 of the device. Content items 702, 704, represent relatively less-rich content such as text (item 704) and text and still image(s) (item 702). Item 706 represents placeholder content comprising relatively less-rich text and still image content. In the examples discussed above, display 700 can correspond to a displayed data set 600 as shown in FIG. 6, in which data items 2 . . . N correspond to displayed content items 702, 704, and placeholder item 1 corresponds to Item 1.

As soon as content controller(s) 102 has completed transmission of (or reception of) placeholder content data set 600 to the requesting device(s) 110, or at any suitable or convenient later time, at 316 content controller(s) 102 can begin downloading to the requesting device(s) 110 of the originally-requested content data set 500 comprising the original relatively-rich content. Such content may, for example, be downloaded to the requesting device(s) 110 using background processes while a corresponding placeholder screen 700 is being displayed or otherwise processed in the foreground of the requesting device(s). For example, at 414 a corresponding relatively rich data set 500 may be transmitted to a responsible wireless base station 122, and at 416 such data set 500 may be downloaded to the requesting device(s) 110 for further processing and display.

FIG. 8 provides a schematic view of a screen 800 representing a downloaded and displayed content data set 500 corresponding to the downloaded and displayed placeholder data set 600 shown as displayed at 700 in FIG. 7. Relatively less-rich content items 702, 704 are displayed in the same manner as before. Relatively rich content 802 has replaced less-rich content 706, and occupies a region of the screen 800 of the same size and relative location as the replaced less-rich content.

In the example shown in FIGS. 7 and 8, relatively rich content 802 comprises audio-visual content, such an mpg. or .avi file related to an automobile. Placeholder content 706 has been selected from logically-related material which can relate for example to the same or another automobile, manufacturer, event, etc. As will be appreciated by those skilled in the relevant arts, any desired artistic, symbolic, or other logical or desired relation may be used in selecting placeholder content.

In the example shown in FIG. 8, relatively rich content 802 comprises interactive graphical user interface (GUI) control devices, e.g. selectable icons, 804, which may be provided according to any suitable or desired protocol. Both screens 700 and 800 comprise in the example standard GUI image control devices, such as scroll bar(s) 710. Control of displayed data sets in accordance with the disclosure may be accomplished by any means or devices suitable for use in accomplishing the purposes disclosed herein.

As may be seen by comparison of FIGS. 7 and 8, substitute placeholder content 706 has been selected by, for example, content controller 102 or device processor 140 to occupy a region of the same relative size and location in the display 700 as occupied by relatively rich content 802 in display 800. This can reduce or eliminate, for example, any resulting re-arrangement of content in the display 800 after relatively rich content has been transmitted to the requesting device(s) 110, with resultant reduction in irritation, inconvenience, or confusion for a user of the device 110.

While the disclosure has been provided and illustrated in connection with specific, presently-preferred embodiments, many variations and modifications may be made without departing from the spirit and scope of the invention(s) disclosed herein. The disclosure and invention(s) are therefore not to be limited to the exact components or details of methodology or construction set forth above. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described. The scope of the invention is to be defined solely by the appended claims, giving due consideration to the doctrine of equivalents and related doctrines.

What is claimed is:

1. A method of displaying data on a display screen of a wireless communications device, the method performed by a display content controller and comprising:
   in response to a request for access to display content data representing relatively rich and relatively non-rich media content, determining a relative size and display location of at least one portion of the display content data which represents relatively rich media content;
   identifying in memory accessible by the display content controller, substitute placeholder data representing display content that is relatively less rich than the rich media content and has a logical relation to the rich media content; and
   providing a substitute display content data set for enabling the wireless communications device to display the non-rich media content and the substitute placeholder data on the display screen, with the substitute placeholder data displayed in the relative size and location of the rich media content.

2. The method of claim 1, further comprising providing the relatively rich media content to the wireless device after the substitute display content data.

3. The method of claim 1, wherein the substitute placeholder data is selected from a plurality of placeholder data sets, based at least partly on the logical relation.

4. The method of claim 1, wherein the substitute placeholder data is stored on the wireless device.

5. The method of claim 1, wherein the substitute display content data set comprises identifiers useable by the wireless device for accessing separately-stored data sets in displaying the non-rich media content.

6. A method of displaying data on a display screen of a wireless communications device, the method performed by a processor of the wireless communications device and comprising:
   upon receipt of a request from the wireless communications device for display content comprising relatively rich and relatively non-rich media content, determining a relative size and display location of at least one portion of the display content which represents relatively rich media content;
   identifying, in memory accessible by the processor, substitute placeholder data representing display content that is relatively less rich than the rich media content and has a logical relation to the rich media content; and
   causing the display screen to display a substitute display content data set for enabling the wireless communications device to display the non-rich media content and the substitute placeholder data on the display screen, with the substitute placeholder data displayed in the relative size and location of the rich media content.

7. The method of claim 6, wherein the substitute placeholder data is identified by the processor from a plurality of placeholder data sets, based at least partly on the logical relation.

8. The method of claim 6, wherein the substitute placeholder data is stored on the wireless device.

9. The method of claim 6, wherein the substitute display content data set comprises identifiers useable by the wireless device for accessing separately-stored data sets in displaying the non-rich media content.

10. A display device for providing data representing content to be displayed on a wireless handheld communications device, the display device comprising:
    a controller and memory coupled thereto, said controller configured to
       in response to a request received for access to data representing display content comprising rich and non-rich media content, determine a relative size and location of at least one portion of the data which represents rich media content,
       indentify in portions of said memory, substitute placeholder data representing display content that is relatively less rich than the rich media content and has a logical relation to the rich media content, and
       provide to the wireless device a substitute display content data set for enabling the wireless handheld device to display the non-rich media content and the substitute placeholder data on a display screen, with the substitute placeholder data displayed in the relative size and location of the rich media content.

11. The device of claim 10, wherein said controller is configured to provide the relatively rich media content to the wireless device after the substitute display content data.

12. The device of claim 10, wherein the substitute placeholder data is selected from a plurality of placeholder data sets, based at least partly on the logical relation.

13. The device of claim 10, wherein the substitute placeholder data is stored on the wireless device.

14. The device of claim 10, wherein the substitute display content data set comprises identifiers useable by the wireless device for accessing separately-stored data sets in displaying the non-rich media content.

15. A wireless communications device for displaying mixed-media content comprising:
   a housing;
   a display carried by said housing;
   wireless communications circuitry carried by said housing; and
   a controller coupled to said display and said wireless communications circuitry, and configured to
   provide a request for display of mixed media content,
   receive, in response to the request for display of mixed media content, a placeholder data set comprising non-rich media content,
   display on said display content represented by the placeholder data set,
   receive a data set representing rich content not included in the placeholder data set and having a logical relation to the placeholder data set, and
   display the rich content on said display in the same size and relative location as previously-displayed non-rich content received with the placeholder data set.

16. The wireless communications device of claim 15, further comprising a memory coupled to said controller; and wherein said controller is configured to access placeholder data in said memory, in response to commands provided with the placeholder data set by said controller, and to display the placeholder data with other content provided within the placeholder data set.

17. A wireless communications device for displaying mixed-media content comprising:
   a housing;
   a display carried by said housing;
   wireless communications circuitry carried by said housing;
   a controller coupled to said display and said wireless communications circuitry, and configured to
   identify a non-rich placeholder data set in response to a request for display of mixed media content,
   display on said display content represented by the placeholder data set,
   receive a data set representing rich content not included in the placeholder data set and having a logical relation to the placeholder data set, and
   display the rich content on said display in the same size and relative location as previously-displayed non-rich content received with the placeholder data set.

* * * * *